US008011600B2

(12) United States Patent
Gray, Jr.

(10) Patent No.: US 8,011,600 B2
(45) Date of Patent: Sep. 6, 2011

(54) FUEL INJECTOR NOZZLE

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 547 days.

(21) Appl. No.: 12/002,944

(22) Filed: Dec. 19, 2007

(65) Prior Publication Data

US 2008/0142622 A1    Jun. 19, 2008

Related U.S. Application Data

(60) Provisional application No. 60/875,692, filed on Dec. 19, 2006.

(51) Int. Cl.
*F02D 1/06*    (2006.01)
*F02D 7/00*    (2006.01)

(52) U.S. Cl. .................. 239/5; 239/533.12; 239/533.2; 239/556; 123/299

(58) Field of Classification Search .............. 239/533.12, 239/533.2, 556, 5; 123/299
See application file for complete search history.

(56) References Cited

U.S. PATENT DOCUMENTS

| 4,919,093 | A | * | 4/1990 | Hiraki et al. ................ 123/299 |
| 5,667,145 | A | * | 9/1997 | Schmidt et al. ........... 239/533.12 |
| 6,553,960 | B1 | * | 4/2003 | Yoshikawa et al. .......... 123/299 |
| 2004/0237929 | A1 | * | 12/2004 | Cavanagh et al. ........... 123/299 |

* cited by examiner

*Primary Examiner* — Dinh Nguyen
(74) *Attorney, Agent, or Firm* — David H. Read

(57) ABSTRACT

A fuel injector nozzle for use with an internal combustion engine utilizes arrangements of nozzle openings that are designed to increase fuel contact with oxygen within a combustion chamber. Nozzle openings are positioned in more than one plane substantially parallel with the cylinder head surface, with the planes preferably at least 2 millimeters apart, and with the respective pluralities of nozzle openings oriented to provide diverging injection angles in relation to the cylinder head surface. The fuel injector is particularly designed for use with oxygen-dilute (e.g., high EGR) controlled temperature combustion, direct injection compression ignition engines.

15 Claims, 2 Drawing Sheets

FUEL INJECTOR NOZZLE

CROSS-REFERENCE TO RELATED APPLICATIONS

This application claims priority from U.S. Provisional Application 60/875,692 "Fuel Injector Nozzle," filed Dec. 19, 2006.

FIELD OF THE INVENTION

This invention relates to fuel injector nozzles for injection of fuel into a combustion chamber.

BACKGROUND AND DESCRIPTION OF THE PRIOR ART

Fuel injection systems inject fuel for combustion in internal combustion engines. In particular for late cylinder direct injection compression ignition engines, such as conventional diesel engines, it has been found that various aspects of the fuel injection event can have a significant impact on the extent of harmful emissions produced in combustion. Some of these factors include the quantity of fuel injected, the number of fuel injection events per cycle, the respective timing of such injection event(s), the fuel injection pressure, rate shaping of the injection event, the various geometries and spacings between the fuel injector and combustion bowl, and the fuel injector nozzle geometry (including number, size, and orientation of holes in the injector nozzle, etc. . . . ).

In order to reduce formation of the harmful pollutant NOx in combustion, many experts advocate avoidance of unnecessary increases in the surface area of fuel exposed to oxygen in the initial portion of a fuel injection event. This generally means limiting the number of holes used in the fuel injector nozzle. As a recent example, U.S. Pat. No. 6,966,294 to Eckerle teaches away from the use of more than six holes in a fuel injector nozzle for a diesel engine, for the stated reason that the use of a greater number of nozzle holes would result in a harmful increase in the formation of NOx in combustion.

In commonly assigned U.S. Pat. No. 6,857,263, which is incorporated herein by reference, applicant set forth a low emission diesel combustion system that reduces NOx formation in combustion, in part through the use of low oxygen concentrations in combustion. With dilute combustion such as this (e.g., with the oxygen concentration of the charge-air used for the main combustion event preferably between 10% and 15%, and more preferably between 12% and 14%), applicant has found it desirable, in contrast, to create greater mixing and greater fuel contact with oxygen as fuel comes out of the fuel injector into the combustion chamber.

U.S. Pat. No. 6,820,587 to Hoglund (column 7, line 65, et seq.) teaches the possibility of a fuel injector nozzle having double rows of openings.

SUMMARY AND OBJECTS OF THE INVENTION

The object of this invention is to provide a fuel injector nozzle that will create increased fuel-air mixing and increased fuel contact with oxygen in the fuel injection event. The nozzle holes of the fuel injector are arranged in more than one plane, with the spacing and angling of the fuel streams preferably designed to result in improved fuel/air mixing and increased fuel contact with oxygen in the fuel injection event.

DETAILED DESCRIPTION OF THE INVENTION

Figure 1:
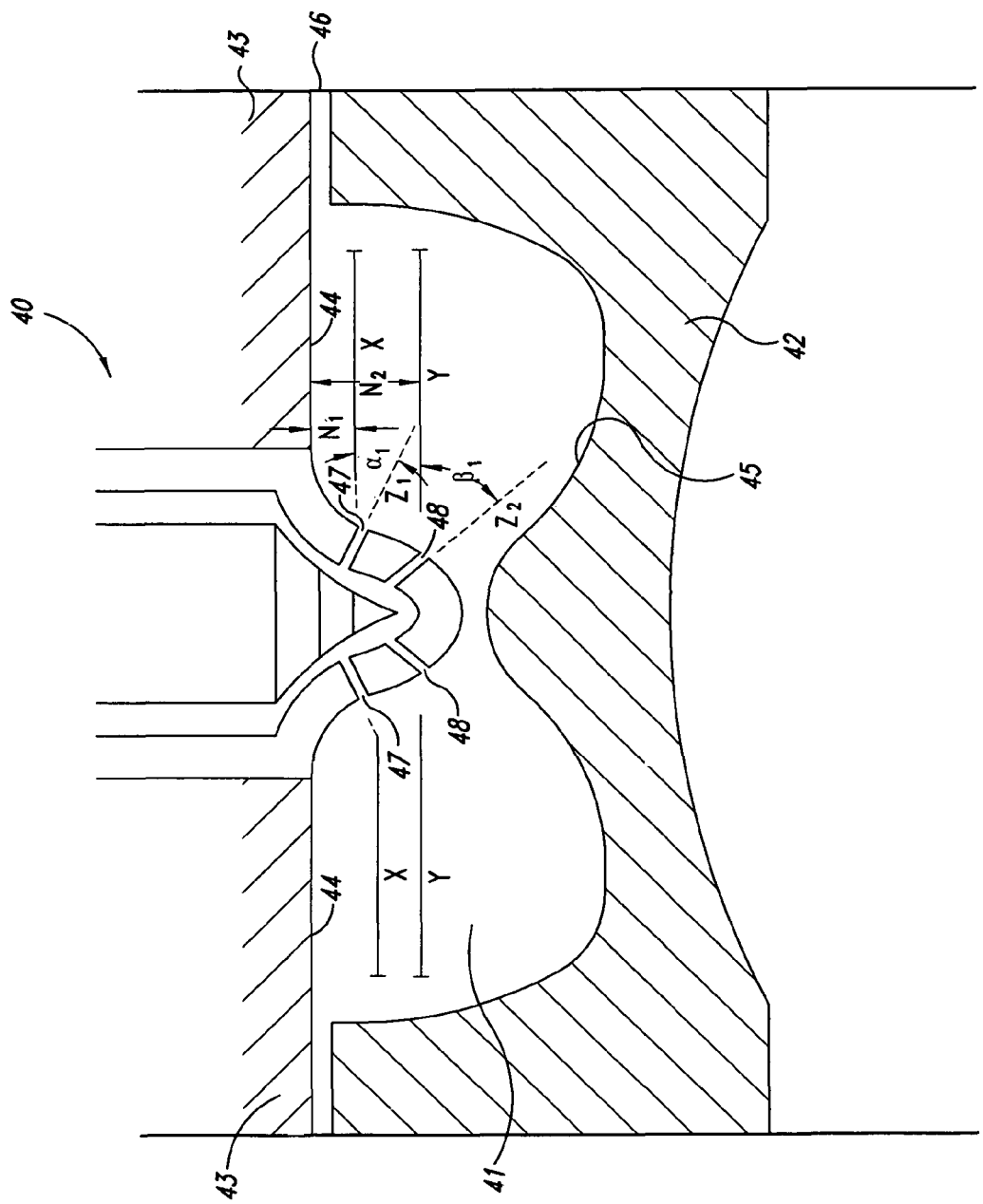
FIG. 1 is a cross-sectional view of a fuel injector nozzle embodiment of the present invention placed within an internal combustion engine combustion chamber.

FIG. 1 sets forth one embodiment for a fuel injector nozzle 40 of the present invention as oriented within a combustion chamber 41 of an internal combustion engine. As the fuel injector nozzles herein are not limited to any particular type of fuel injector or fuel injection system, only the nozzle configurations will be discussed herein.

Referring to FIG. 1, nozzle 40 of a fuel injector (not fully shown) extends into combustion chamber 41 toward piston 42 (shown here near top dead center (TDC)) and away from cylinder-head 43. The cylinder head's bottom surface 44, piston top surface 45, and cylindrical wall 46 define the combustion chamber 41, with the cylinder head bottom surface 44 constituting the top surface of combustion chamber 41. Nozzle 40 includes two groups of nozzle openings. The first plurality of nozzle openings, marked as openings 47, lie generally within a first plane X which is substantially parallel with cylinder head surface 44. First plane X is spaced from cylinder head surface 44 by a first distance $N_1$. A second plurality of nozzle openings in nozzle 40, marked as openings 48, lie generally within a second plane Y that is also substantially parallel with cylinder head surface 44, but spaced a second distance $N_2$ from surface 44. The distance between plane X and plane Y is preferably between about 2 mm and 6 mm. Distance $N_2$ is preferably also at least 1.5 times the distance $N_1$, and more preferably 2-3 times the distance $N_1$. When stated herein that nozzle openings lie within a plane, it is meant, for example, that the nozzle openings are of similar distance from a reference plane (e.g., the cylinder head bottom surface) or that the nozzle openings are generally aligned within a plane.

Continuing with FIG. 1, fuel injected through the first plurality of nozzle openings 47 enter combustion chamber 41 in a nominal cone marked as $Z_1$ in FIG. 1, at an angle $\alpha_1$ from plane X. In comparison, fuel injected through the second plurality of nozzle openings 48 enter the combustion chamber 41 in a nominal cone marked as $Z_2$ in FIG. 1, at an angle $\beta_1$, which angle is preferably larger than angle $\alpha_1$. Preferably, the fuel injector is configured to selectively allow injection of fuel simultaneously from the two planes of nozzle openings. Also preferably, fuel injected through the first plurality of nozzle openings 47 and fuel injected through the second plurality of nozzle openings 48 enter combustion chamber 41 in such a manner as to achieve a more uniform distribution of fuel within the volume of combustion chamber 41, and increased fuel-air mixing and increased fuel contact with oxygen within chamber 41 is the result.

Figure 2:
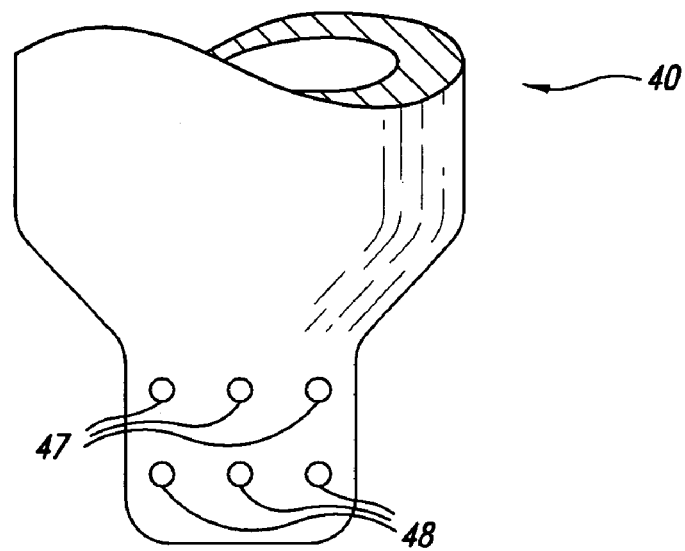
FIG. 2 is another view of the fuel injector nozzle embodiment of FIG. 1.

FIG. 2 illustrates one preferred example arrangement of nozzle openings 47 and 48 in nozzle 40. The embodiment shown includes six nozzle openings within each plane of nozzle openings, located on an extended-tip nozzle. Other numbers of nozzle openings in each plane may also be used as desired. It is also illustrated that the nozzle openings 48 are aligned with the nozzle openings 47 around the circumference of nozzle 40, and that the nozzle openings 48 and 47 are approximately the same size. However, the nozzle openings 48 could also be made to be of different size from the nozzle openings 47, nozzle openings within each plane may be made to be of different sizes, and/or the openings 47 and 48 could be laterally offset instead of aligned around the circumference of nozzle 40.

Figure 3:
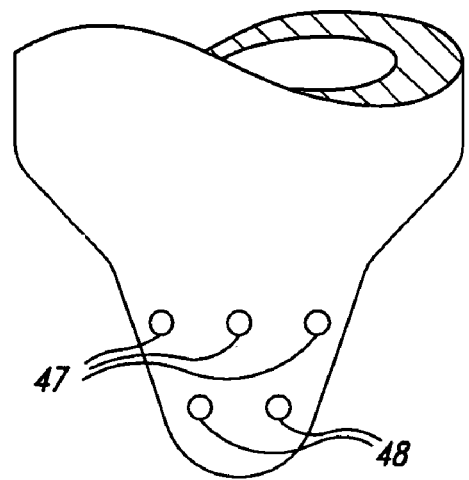
FIG. 3 is a view of a second embodiment of a fuel injector nozzle of the present invention.

The fuel injector nozzle of FIG. 3 illustrates a sample alternative embodiment of the present invention, without an extended tip for the nozzle, with the openings laterally offset, and with different numbers of nozzle openings within each plane of the nozzle.

Conventionally, in a fuel injection event, fuel is injected out of nozzle openings that all fall within a single plane around the circumference of the nozzle, and at a single departure angle from the cylinder head surface. In contrast, the purpose of the present invention in utilizing nozzle openings that fall within different planes, and/or inject fuel at different angles from the cylinder head surface, is to create more divergent fuel streams in the injection event and to thereby create greater initial fuel contact with oxygen in the combustion chamber. It will be understood that various other nozzle arrangements involving multiple (i.e., including more than two) planes of nozzle openings or multiple injection angles could also be used to meet the objectives of this invention, and thus may be encompassed by the present invention.

It should further be noted that the fuel injector nozzles described in this patent application may be beneficially used with fuel injectors and fuel injection systems of any type, as will be understood in the art.

Accordingly, the invention is not limited herein except by the appended claims.

I claim:

1. A fuel injector nozzle, comprising:
   a first plurality of nozzle openings positioned laterally around the circumference of the fuel injector nozzle and lying generally within a first plane, said first plane configured to be substantially parallel to a cylinder head bottom surface when the fuel injector nozzle is positioned within a combustion chamber of an internal combustion engine; and
   a second plurality of nozzle openings, fluidly connected with the first plurality of nozzle openings and configured to allow injection of fuel simultaneously from the first and second pluralities of nozzle openings, also positioned laterally around the circumference of the fuel injector nozzle and lying generally within a second, separate, plane, said second plane also configured to be substantially parallel to a cylinder head bottom surface when the fuel injector nozzle is positioned within a combustion chamber of an internal combustion engine, and wherein the distance between the first plane and the second plane is greater than 2 millimeters;
   wherein the first plurality of nozzle openings is configured to allow injection of fuel at a first departure angle in relation to the cylinder head bottom surface of a combustion chamber, and the second plurality of nozzle openings is configured to allow injection of fuel at a second, different and larger departure angle in relation to the cylinder head bottom surface of a combustion chamber, such that injection of fuel from the first and second pluralities of nozzle openings results in respectively diverging pluralities of fuel streams.

2. The fuel injector nozzle of claim 1, wherein the first and second planes are additionally perpendicular to a central longitudinal axis of the fuel injector nozzle.

3. The fuel injector nozzle of claim 1, wherein the distance between the first plane and the second plane is greater than 3 millimeters.

4. The fuel injector nozzle of claim 1, wherein the distance between the cylinder head surface and the second plane is at least 1.5 times the distance between the cylinder head surface and the first plane.

5. The fuel injector nozzle of claim 4, wherein the distance between the cylinder head surface and the second plane is at least two times, but not more than three times, the distance between the cylinder head surface and the first plane.

6. The fuel injector nozzle of claim 1, wherein the first and second pluralities of nozzle openings are laterally offset from each other around the circumference of the fuel injector nozzle.

7. The fuel injector nozzle of claim 1, wherein the first and second pluralities of nozzle openings are laterally aligned with each other around the circumference of the fuel injector nozzle.

8. The fuel injector nozzle of claim 1, wherein the first plurality of nozzle openings and the second plurality of nozzle openings each comprise six nozzle openings.

9. A fuel injector, comprising:
   a fuel injector nozzle;
   a first plurality of nozzle openings positioned laterally around the circumference of the fuel injector nozzle and lying generally within a first plane, said first plane configured to be substantially parallel to a cylinder head bottom surface when the fuel injector nozzle is positioned within a combustion chamber of an internal combustion engine;
   a second plurality of nozzle openings, fluidly connected with the first plurality of nozzle openings, also positioned laterally around the circumference of the fuel injector nozzle and lying generally within a second, separate, plane, said second plane also configured to be substantially parallel to a cylinder head bottom surface when the fuel injector nozzle is positioned within a combustion chamber of an internal combustion engine, and wherein the distance between the first plane and the second plane is greater than 2 millimeters;
   a needle valve configured to selectively allow injection of fuel simultaneously from the first and second pluralities of nozzle openings; and
   wherein the first plurality of nozzle openings is configured to allow injection of fuel at a first departure angle in relation to the cylinder head bottom surface of a combustion chamber, and the second plurality of nozzle openings is configured to allow injection of fuel at a second, different and larger departure angle in relation to the cylinder head bottom surface of a combustion chamber, such that injection of fuel from the first and second pluralities of nozzle openings results in respectively diverging pluralities of fuel streams.

10. A method of injecting fuel into a combustion chamber of an internal combustion engine, comprising:
   injecting fuel into the combustion chamber at a uniform first angle in relation to a top surface of the combustion chamber, through a first row of nozzle openings arranged around a fuel injector nozzle;
   simultaneously injecting fuel into the combustion chamber at a second, different angle in relation to the top surface of the combustion chamber, through a second row of nozzle openings around the fuel injector nozzle, wherein the distance between the first and second rows of nozzle openings is greater than 2 millimeters;
   thereby producing respectively diverging first and second pluralities of fuel streams into the combustion chamber.

11. The method of claim 10, wherein the nozzle openings in the first and second rows are laterally offset from each other around a circumference of the fuel injector nozzle.

12. The method of claim 10, wherein the nozzle openings in the first and second rows are laterally aligned with each other around a circumference of the fuel injector nozzle.

13. The method of claim 10, wherein the first and second rows of nozzle openings respectively comprise six nozzle openings each.

14. The method of claim 10, further comprising injecting the fuel streams into a combustion chamber containing an oxygen concentration below 15%.

15. The method of claim 10, further comprising injecting the fuel streams into a combustion chamber containing an oxygen concentration between 12% and 14%.

* * * * *